(Model.)
G. LANING.
FEED TROUGH.
No. 331,507. Patented Dec. 1, 1885.
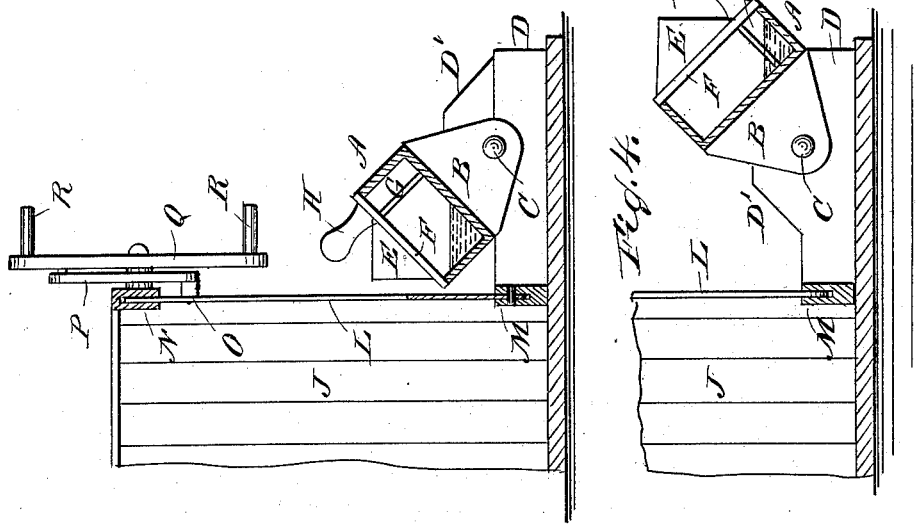
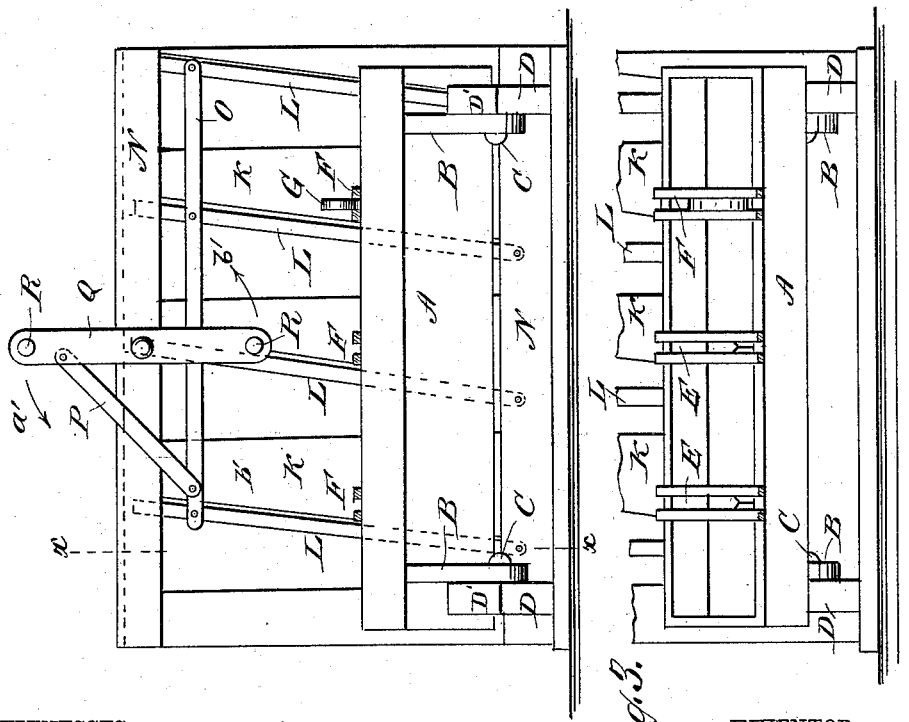
WITNESSES:
Theo. G. Hoster
C. Sedgwick
INVENTOR:
G. Laning
BY Munn & Co.
ATTORNEYS.

UNITED STATES PATENT OFFICE.

GEORGE LANING, OF LA SALLE, ILLINOIS.

FEED-TROUGH.

SPECIFICATION forming part of Letters Patent No. 331,507, dated December 1, 1885.

Application filed June 4, 1885. Serial No. 167,685. (Model.)

*To all whom it may concern:*

Be it known that I, GEORGE LANING, of La Salle, in the county of La Salle and State of Illinois, have invented a new and Improved Feed-Trough, of which the following is a full, clear, and exact description.

The object of my invention is to provide a new and improved feed-trough, which can be swung toward the animals, and is provided with a series of partitions dividing it into compartments, so that each animal gets the same quantity of food.

The invention consists in the construction and combination of parts and details and combinations of the same, as will be fully set forth hereinafter and claimed.

Reference is to be had to the accompanying drawings, forming part of this specification, in which similar letters of reference indicate corresponding parts in all the figures.

Figure 1 is a front view of my improved feed-trough. Fig. 2 is a cross-sectional view of the same on the line $x\,x$, Fig. 1. Fig. 3 is a front view of the trough. Fig. 4 is a cross-sectional view of the same.

The trough A is provided with lugs B, projecting from the bottom, and the said lugs are pivoted by pivots C to upright boards D, having bevels D', so that the trough can be swung forward and back upon the front or rear bevels. The trough is divided into compartments by partitions E, held between transverse slats F, secured on the top edges of the trough. The said partitions extend to within short distances from one side of the trough, and between the ends of the partitions and the side of the trough a slide, G, can be placed, which is provided with a handle, H. The trough is arranged at one end of the stall J, and the said end of the stall is provided with a series of stanchions, K, between which the animals can poke their heads to get at the trough. Bars L are pivoted to a base, M, between the stanchions, and their upper ends are guided by a groove in a bar, N, on the upper ends of the stanchions. The upper ends of the bars L are united by a bar, O, pivoted to the same, and to the said bar O a connecting-bar, P, is pivoted which has its other end pivoted to a bar, Q, pivoted on the bar N, and having handles R.

The operation is as follows: The trough A is swung into the position shown in Fig. 4, and the milk or liquid food is poured into the trough and the same flows equally into the different compartments between the partitions E, and the trough is swung into the position shown in Fig. 2. By placing the slide G at different partitions the trough can be adjusted for receiving a greater or less quantity of food. When but a small quantity of food is required, the slide is so adjusted that the food will be in one-half or one-third of the trough, the other part being shut off. The animals poke their heads between the stanchions K, and the lever Q is swung in the direction of the arrow $a'$, whereby the bars L are swung in the direction of the arrow $b'$, and the heads of the animals held between the stanchions K and the bars L, thus preventing the animals from withdrawing their heads and poking them into the compartments of other animals.

Having thus described by invention, I claim as new and desire to secure by Letter Patent—

1. The combination, with the pivoted trough, of the partitions E, extending to within short distances from one side of the trough, and of the slides G, between the ends of the partitions and the side of the trough, substantially as herein shown and described.

2. The combination, with the pivoted trough A, of the transverse slats F, the partitions E, and the slides G, between the slats, substantially as herein shown and described.

GEORGE LANING.

Witnesses:
GEORGE M. MURPHEY,
WILLIAM REED.